Figure 1:
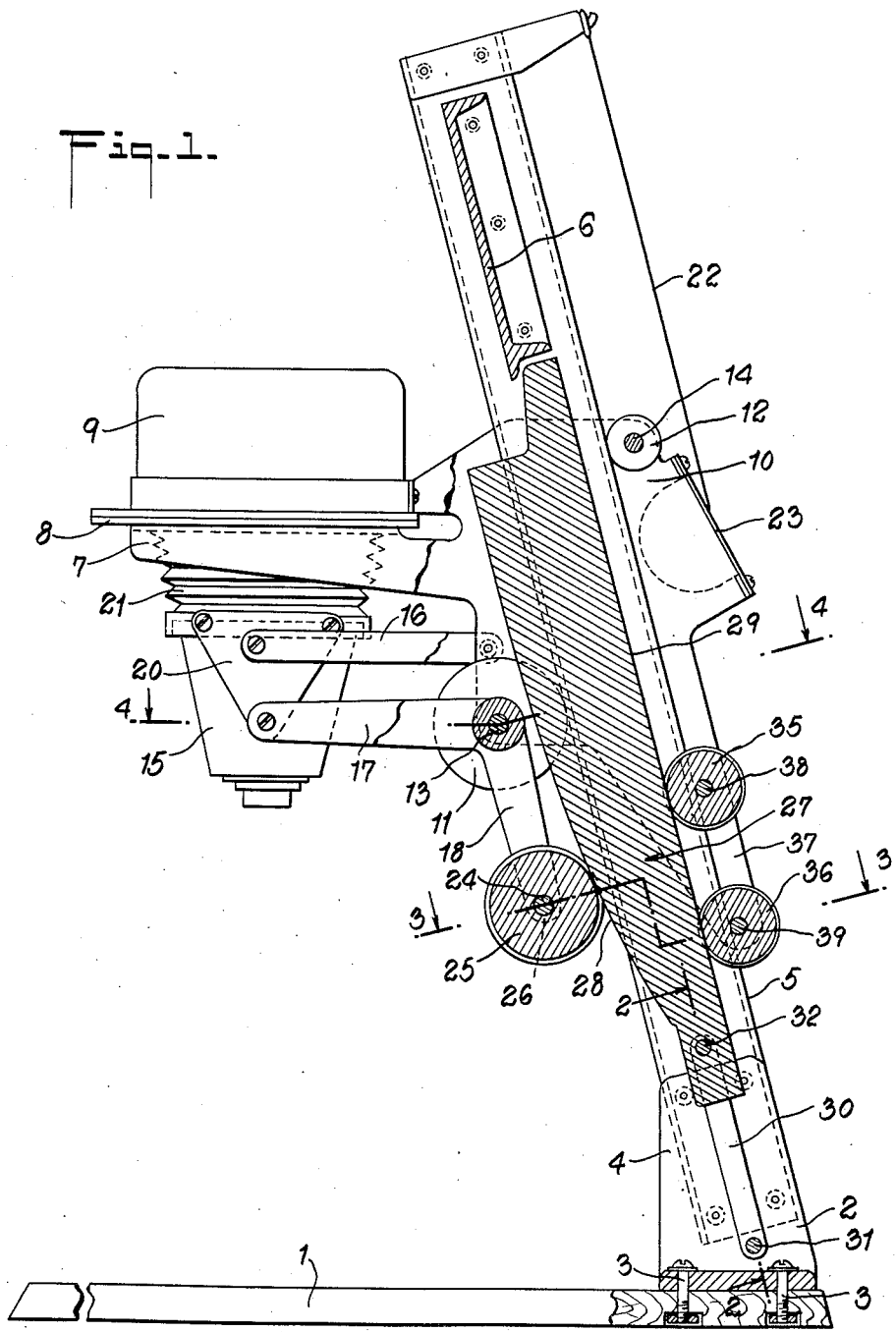

Nov. 19, 1957 A. SIMMON 2,813,454
AUTOFOCUSING OPTICAL APPARATUS
Filed March 9, 1954 3 Sheets-Sheet 1

INVENTOR.
ALFRED SIMMON
BY
Kenyon & Kenyon
ATTORNEYS

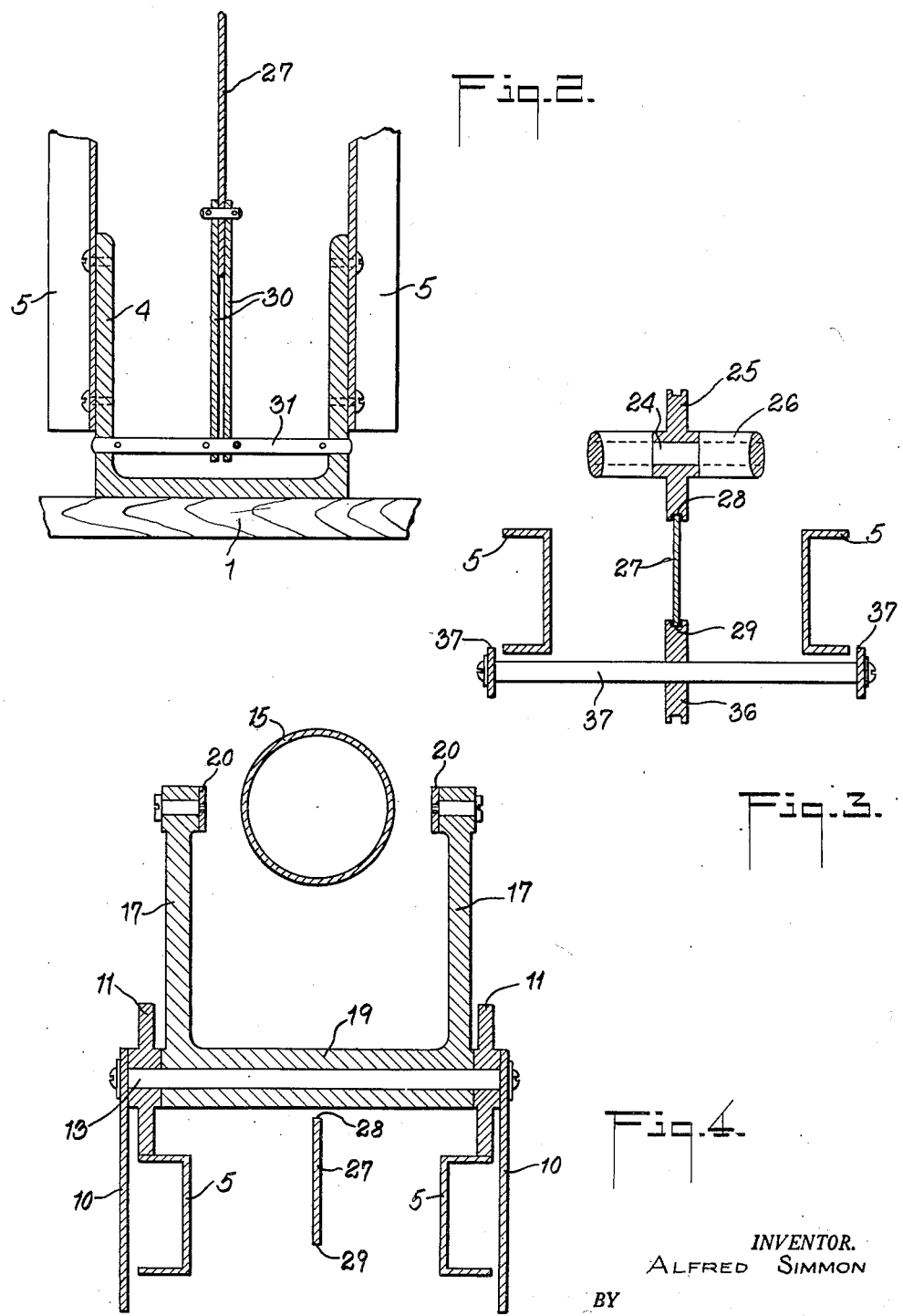

Nov. 19, 1957     A. SIMMON     2,813,454
AUTOFOCUSING OPTICAL APPARATUS

Filed March 9, 1954     3 Sheets-Sheet 3

*INVENTOR.*
ALFRED SIMMON
BY
Kenyon & Kenyon
ATTORNEYS

United States Patent Office
2,813,454
Patented Nov. 19, 1957

2,813,454

AUTOFOCUSING OPTICAL APPARATUS

Alfred Simmon, Garden City, N. Y., assignor to Simmon Brothers, Inc., Long Island City, N. Y., a corporation of New York Application March 9, 1954, Serial No. 414,984

4 Claims. (Cl. 88—24)

This invention relates to autofocusing optical apparatus and particularly to the type of such apparatus having an optical assembly slidably mounted on an elongated support with this assembly having a movable focusing element actuated by a cam which is anchored relative to the support. A cam follower, which slides on the cam, is connected to the focusing element, the cam being contoured so as to maintain the desired focus when the assembly slides to different positions along the support.

Autofocusing photographic enlargers, copying cameras and the like may be of the above type. In such cases the elongated support is usually mounted in an upstanding position which may be either vertical or angular.

In accordance with the prior art the cam is mounted rigidly against any movement relative to the support on which the optical assembly slides. Therefore, the front and back sides of the support, on which the optical assembly bears while sliding, must be finished so that they are mutually parallel and linear to a high degree of accuracy. If this is not done the optical assembly may be caused to move transversely relative to the support when slid therealong, this causing the cam follower to be moved correspondingly relative to the cam and thus interfering with maintenance of an accurate focus. In the case of a photographic enlarger, for example such transverse motion may throw the projected image out of focus for one degree of enlargement whereas the enlarger may maintain accurate focus for other degrees of enlargement requiring the projector to be slid to other positions on the upstanding support, it being understood that this has reference to the autofocusing type of enlarger.

Because of the above the cost of autofocusing optical apparatus, of the type described, has been required to reflect the cost of finishing the working surfaces of the elongated support by methods providing the required degree of precision. It has not been possible to use ordinary structural shapes such as extruded channels and the like without resorting to expensive finishing methods.

With the above in mind, one of the objects of the present invention is to provide an autofocusing optical apparatus, such as a photographic enlarger, which is of the type having an optical assembly sliding on an elongated support but which is so constructed as to either eliminate or greatly reduce the need for finishing the working surfaces of the support with a high degree of accuracy while providing for an accurate focusing action in an automatic manner as the optical assembly is slide to different positions along the support. In other words, it is desired to provide a construction which will permit the described type of automatic focusing operation without requiring the extremely accurate finishing of the support's sliding surfaces which is made necessary by the prior art constructions. Another object is to provide an autofocusing optical apparatus, of the described type, which will provide for more accurate automatic focusing than has heretofore been obtainable.

Figure 5:
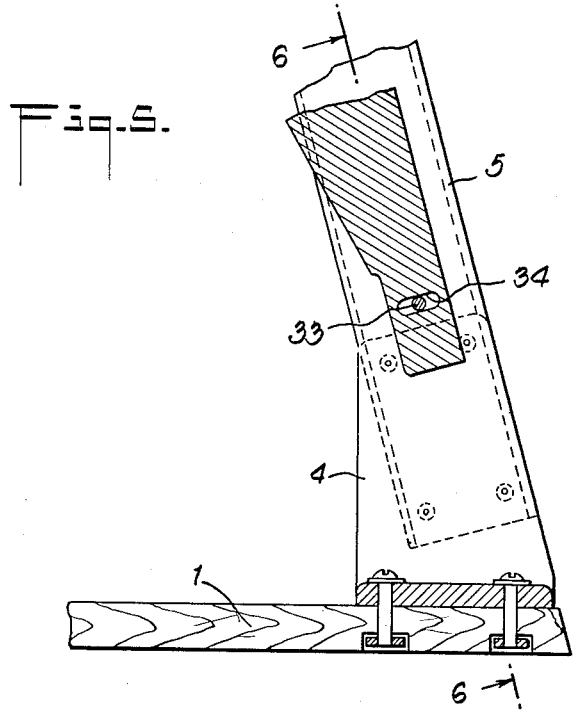
Figure 6:
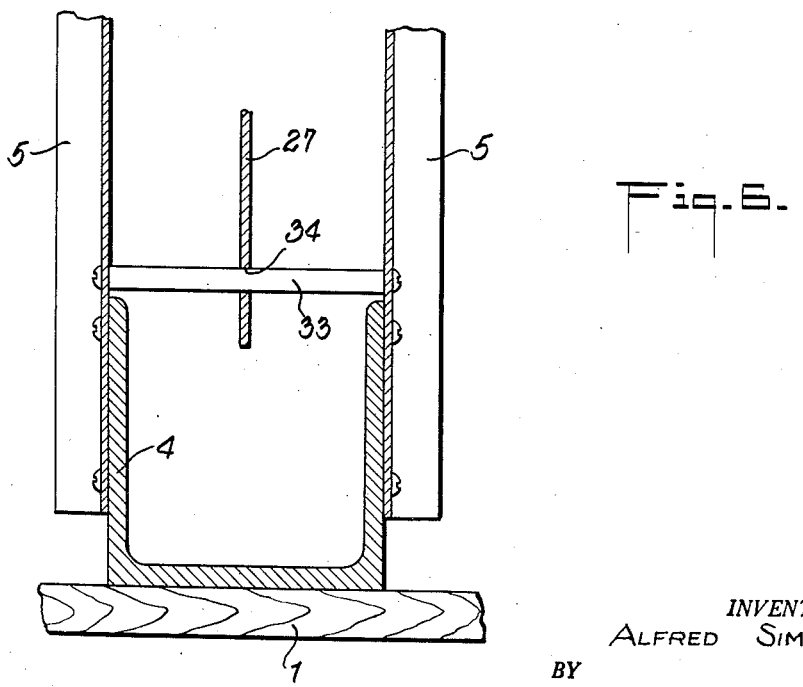

Other objects may be inferred from the following disclosure of an autofocusing photographic enlarger which incorporates the principles of the present invention. This enlarger is illustrated by the accompanying drawings in which:

Fig. 1 is a vertical section of this enlarger excepting that the projector itself is shown in elevation;
Fig. 2 is a longitudinal section taken on the line 2—2 in Fig. 1 at right angles to the section plane of that figure;
Fig. 3 is a cross section taken on the line 3—3 in Fig. 1;
Fig. 4 is a cross section taken on the line 4—4 in Fig. 1;
Fig. 5 shows the bottom right-hand corner portion of Fig. 1 as the enlarger appears in a modified form; and
Fig. 6 is a view similar to Fig. 2 excepting that it shows the modification of Fig. 5.

The illustrated enlarger has a flat base board 1 on top of which may be placed the photographic paper on which the exposure is to be made. In case the paper is to be mounted by an easel located on top of this board, suitable compensation must be made for the higher focal plane, in connection with the automatic focusing mechanism.

At the central portion of the rear edge of this board 1 a cast metal U-shaped bracket 2 is rigidly fixed by screw fastenings 3 which pass through the bracket and board. The bracket has upstanding arms 4 which angle forwardly with respect to the board 1 and to which outwardly facing extruded metal channels 5 are rigidly secured so as to project upstandingly above the board 1 at the angle of the arms 4. The two channels 5 are reinforced respecting each other by a plurality of struts or, as is illustrated, by a single extended strut member 6. These channels are arranged so that their flanges are mutually parallel to each other and, as to each channel, the front and back flanges are mutually parallel and linear, at least within ordinary commercial limits.

The projector includes a housing 7 which mounts the negative carrier 8, establishing a focal plane for this optical assembly, and a lamp housing 9 which encloses a suitable light source for directing light through a negative held by the carrier 8. The projector has a carriage portion 10 which embraces the two channels 5 and which engages the front sides of the channels' front flanges by means of bearing rollers 11, and the back sides of the rear flanges by means of bearing rollers 12. The rollers 11 are journaled on an axle 13, and the rollers 12 are journaled on an axle 14, both axles being mounted on the carriage portion 10.

The projector is completed by a conical lens mount 15 which is supported beneath the negative carrier 8 by a parallelogram consisting of two laterally spaced links 16 which connect the lens mount 15 with the carriage portion 10, and by the horizontal arms 17 of two laterally spaced bell cranks, the other arms 18 of these bell cranks depending approximately parallel to flanges of the two channels 5. The links 16 may be separate links as shown, while the two bell cranks described may be formed by an integral forging or casting having a tubular interconnecting shaft 19. The conical lens mount 15 is provided with diametrically opposite triangular plates 20 to which the links and bell crank arms are pivotally connected, the other ends of the links 16 being pivotally connected to the carriage portion 10 and the tubular part 19, of the bell cranks, being mounted on the axle 13 on which the rollers 11 are mounted.

The projector assembly is completed, insofar as is required to understand the present invention, by a flexible bellows 21 which provides a shield between the bottom of the negative carrier 8 and the top of the conical lens mounting 15 and by a counterbalancing strap 22 which extends from the top of the channels 5 to a spring tension reel enclosed by a housing 23 mounted by the carriage portion 10 of the projector.

The ends of the depending bell crank arms 18 mount an axle 24 on which a cam follower 25 is centrally mounted, this cam follower being formed as an integral part with a tubular mounting 26 which rides on the axle 24 and serves to locate the cam follower.

Now it can be seen that the projector forms an optical assembly having the interspaced lower bearings 11 and upper bearings 12 sliding respectively on the front and back sides of the front and back flanges of the two channels forming the elongated upstanding support. The assembly is transversely offset forwardly from the front sides of the front channel flanges and the conical lens mount 15 forms a movable focusing element. The cam follower 25 is connected to this element so as to move the latter in response to transverse motion of the follower with respect to the assembly's sliding direction, and the follower moves in the direction of the support.

An elongated cam 27, in the form of a plate, has a front cam surface 28 which is contoured to actuate the follower 25 and this cam has a linear back surface 29. This cam is located between the two upstanding channels 5 so that its surfaces 28 and 29 are upstanding with its front surface 28 facing towards the follower 25 and engaged by the latter. The weight of the conical lens mount 15 biases the follower 25 to move towards the cam and press the latter backwardly.

Now if the cam plate 27 is rigidly positioned with respect to the two channels any deviation in the parallelism between the channels' front and back surfaces, or any depressions or other defects in either the front or back surfaces, causes the projector to rotate about one or the other of the axles 13 and 14. This effects deviations in the angular relation between the projector and the elongated support and since the projector is offset from the latter this motion is accented. Although this moves the lens mount 15 along with the projector relative to the base board 1, this motion is not sufficient to have a practical effect on the focus, but when this motion is imparted to the bell crank arms 18 and the follower 25, the latter, when cooperating with a fixed cam plate, shifts the lens mount 15 relative to the negative carrier 8. This changes the focus of the projector and does have a substantial effect. A very slight change in the angularity of the projector in a vertical plane extending in the projector's offset direction, and which is imparted to the follower 25, is sufficient to throw the image on the focal plane above the base board 1 out of focus.

According to the present invention means are provided for connecting the cam plate 27 to the upstanding support so that the cam is anchored against movement substantially parallel to the front and back sides of the respective front and back flanges but so that the cam is free to move for at least a limited extent transverse to the support both angularly and linearly in a plane substantially parallel to the vertical plane through which the projector deviates.

As shown by Figs. 1 and 2, the above means is provided by links 30 having their bottom ends pivoted on a pin 31 passed transversely through the bracket member 2 and their upper ends pivoted to the lower end of the cam 27 by a pivot pin 32. As shown in Figs. 5 and 6, a single pivot pin 33 extends between the the lower ends of the two channels 5, and the cam plate has a transversely extending slot 34 formed through it and through which the pin 33 is passed.

In either of the above cases the cam 27 may float in a vertical plane both angularly and linearly and with this plane being parallel with or coinciding with the plane of motion which the follower 25 receives due to the previously described deviations on the part of the projector and resulting from slight inaccuracies in the front and back surfaces of the support on which the projector slides up and down.

Now the follower 25 is biased to move towards the cam and this, therefore, tends to push the cam 24 backwardly. This action is restrained by two rollers 35 and 36. These rollers are rigidly secured to a depending extension 37 which is part of the carriage portion 10 of the projector. The rollers are mounted by this part 37 by means of pivot pins 38 and 39 respectively. This is done so that the two rollers are equally spaced above and below a location directly opposite to the follower 25. By arranging these rollers 35 and 36 above and below the level of the cam follower 25, the cam plate is gripped between a three point suspension of which the points formed by the rollers 35 and 36 are rigidly related angularly with respect to the projector.

Now with this new construction any angular deviation between the projector and the support on which it slides is transmitted to the cam 27 so that the latter is moved in a manner compensating for the fact that the cam follower 25 has had the deviation transmitted to it by being mounted on the projector. The rollers 35 and 36 function as a locator for the cam 29 whereby the cam participates in any deviations in the angularity or in any other transverse manner with respect to the support on which it slides, with the understanding that the deviation must be in the moving direction of the cam follower 25 to be harmful in any event.

It is to be understood that the contoured cam surface 28 must be related to the focal length of any lens mounted by the lens mount 15. The location of the rollers 35 and 36 ordinarily are such as to locate the parallel surface 29 parallel to the working surfaces of the two channels when these surfaces are true. When these surfaces are not carefully finished by precision manufacturing methods, they will always involve the possibility of the deviations previously mentioned. The novel construction causes the cam 27 to participate in any such deviations so that the motion resulting therefrom is in effect cancelled respecting the cam follower 25 and the cam 27. Therefore, the present invention makes it unnecessary to finish the support's working surfaces with the degree of precision previously required while, at the same time, maintaining an accurate focus at all times during the use of the enlarger.

The principles of this invention may be embodied in forms other than are illustrated by the drawings and described hereinabove. For example, the sliding bearing elements and the cam follower are illustrated as being rollers but they could be plain sliding surfaces although this would increase the friction. The locations of parts may be reversed, as exemplified by the possibility of fixing the pin 33, in Figs. 5 and 6, rigidly to the cam and forming slots in the two channels 5 with the pin's ends located in these slots which would then function like the slot 34. Changes of this character do not prevent attainment of the desirable results which have been described, and are to be considered as being within the scope of this invention and the claims appended hereto.

Furthermore, various additions may be made to the illustrated form, as may be desirable in producing a commercial device. Thus, the lamp housing may be provided with a lifting mechanism to facilitate placement of the negative carrier 8, and the carriage portion 10 and the upstanding support may be provided with rack and pinion gears arranged to raise and lower the carriage portion and the parts it mounts, the pinion having a hand crank or wheel so that the degree of enlargement may be more conveniently adjusted. So that the same device may be used with a plurality of lenses, of differing focal lengths, a plurality of the cams may be provided, each contoured for one of the lenses, the cams being interspaced laterally but otherwise mounted as described, or by an equivalent arrangement, and the cam follower being mounted so it may be shifted from one cam to another as required by the lens being used. These, and other features of commercial value, have not been illustrated because this has been considered to be unnecessary in connection with explaining this invention. The appended claims are in-

I claim:

1. Autofocusing optical apparatus including an elongated support, an optical assembly slidably mounted on said support and having a movable focusing element and a cam follower connected to this element so as to move the latter when the follower is moved in a transverse direction with respect to the assembly's sliding direction, a cam having a plurality of elongated surfaces and located with these surfaces extending in said sliding direction and with said follower slidingly engaging one of these surfaces, means for anchoring said cam against motion in said sliding direction while permitting it to move for at least a limited extent in said transverse direction, and a locator sliding on and engaging another of said surfaces and which is immovably mounted on said assembly with respect to motion in said transverse direction, said surfaces facing in opposite directions and said follower being biased to move towards the surface it engages and said locator being positioned substantially opposite to the follower so as to locate said cam with respect thereto, the surface engaged by the follower being contoured and the surface engaged by the locator being linear, said means for anchoring the cam permitting the latter to move both angularly and linearly in said transverse direction and said locator being constructed to engage said linear surface at locations which are spaced therealong on both sides of a location aligned with said follower transversely with respect to said surfaces.

2. Autofocusing optical apparatus including an elongated upstanding support having front and back sides, an optical assembly having interspaced lower and upper bearings sliding respectively on said front and back sides, said assembly being transversely offset from said front side and having a movable focusing element and a cam follower connected to this element so as to move the latter in response to transverse movement of the follower with respect to the assembly's sliding direction and in the direction of said support, an elongated cam having a front cam surface contoured to actuate said follower and a linear back surface, said cam being located adjacent to said support with its said surfaces upstanding and its front surface towards said follower and engaged thereby, said follower being biased to move towards said cam, said support's front and back sides being substantially mutually parallel and linear and any deviations therefrom causing deviations of said bearings imparting angular deviations to said assembly in a vertical plane extending in said assembly's offset direction and which are imparted to said follower, and means for connecting said cam to said support so that the cam is anchored against movement substantially parallel to said support's sides but is free to move at least a limited extent transverse thereto angularly and linearly in a plane substantially parallel to said vertical plane, said assembly having a plurality of bearings sliding on said cam's linear surface respectively above and below the level of said follower and which are rigidly mounted on said assembly so as to participate in said deviations and impart them to said cam so that the latter deviates compensatingly with said follower.

3. Autofocusing optical apparatus including an elongated upstanding support having front and back sides, an optical assembly having interspaced lower and upper bearings sliding respectively on said front and back sides, said assembly being transversely offset from said front sides and having a movable focusing element and a cam follower connected to this element so as to move the latter in response to transverse movement of the follower with respect to the assembly's sliding direction and in the direction of said support, an elongated cam having a front cam surface contoured to actuate said follower and a linear back surface, said cam being located adjacent to said support with its said surfaces upstanding and its front surface towards said follower and engaged thereby, said follower being biased to move towards said cam, said support's front and back sides being substantially mutually parallel and linear and any deviations therefrom causing deviations of said bearings imparting angular deviations to said assembly in a vertical plane extending in said assembly's offset direction and which are imparted to said follower, and means for connecting said cam to said support so that the cam is anchored against movement substantially parallel to said support's sides but is free to move at least a limited extent transverse thereto angularly and linearly in a plane substantially parallel to said vertical plane, said assembly having a plurality of bearings sliding on said cam's linear surface respectively above and below the level of said follower and which are rigidly mounted on said assembly so as to participate in said deviations and impart them to said cam so that the latter deviates compensatingly with said follower, said means for connecting said cam to said support comprising a link pivotally connected to an end of the cam and to said support.

4. Autofocusing optical apparatus including an elongated upstanding support having front and back sides, an optical assembly having interspaced lower and upper bearings sliding respectively on said front and back sides, said assembly being transversely offset from said front side and having a movable focusing element and a cam follower connected to this element so as to move the latter in response to transverse movement of the follower with respect to the assembly's sliding direction and in the direction of said support, an elongated cam having a front cam surface contoured to actuate said follower and a linear back surface, said cam being located adjacent to said support with its said surfaces upstanding and its front surface towards said follower and engaged thereby, said follower being biased to move towards said cam, said support's front and back sides being substantially mutually parallel and linear and any deviations therefrom causing deviations of said bearings imparting angular deviations to said assembly in a vertical plane extending in said assembly's offset direction and which are imparted to said follower, and means for connecting said cam to said support so that the cam is anchored against movement substantially parallel to said support's sides but is free to move at least a limited extent transverse thereto angularly and linearly in a plane substantially parallel to said vertical plane, said assembly having a plurality of bearings sliding on said cam's linear surface respectively above and below the level of said follower and which are rigidly mounted on said assembly so as to participate in said deviations and impart them to said cam so that the latter deviates compensatingly with said follower, said means for connecting said cam to said support comprising a pin rigidly connected to said support and the cam having a transversely extending slot formed therethrough and through which the pin is passed.

References Cited in the file of this patent

UNITED STATES PATENTS 2,076,552    Draeger _____ Apr. 13, 1937

FOREIGN PATENTS 592,630    Germany _____ Feb. 12, 1934